(12) United States Patent
Meier et al.

(10) Patent No.: US 8,479,998 B2
(45) Date of Patent: Jul. 9, 2013

(54) TERMINAL HAVING OPTICAL IMAGING ASSEMBLY

(75) Inventors: Timothy P. Meier, Camillus, NY (US); William H. Havens, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/018,166

(22) Filed: Jan. 31, 2011

(65) Prior Publication Data

US 2012/0193430 A1    Aug. 2, 2012

(51) Int. Cl.
*G06K 7/10* (2006.01)
(52) U.S. Cl.
USPC ............. 235/472.01; 235/454; 235/462.45
(58) Field of Classification Search
USPC ............. 235/454, 455, 462.01–472.03
See application file for complete search history.

(56) References Cited

U.S. PATENT DOCUMENTS

| | | |
|---|---|---|
| 4,843,222 A | 6/1989 | Hochgraf |
| 5,037,201 A | 8/1991 | Smith, III et al. |
| 5,119,939 A | 6/1992 | Teeter et al. |
| 5,173,599 A | 12/1992 | Setani |
| 5,175,426 A | 12/1992 | Chuan-Yu |
| 5,468,950 A | 11/1995 | Hanson |
| 5,616,907 A | 4/1997 | Hasegawa et al. |
| 5,623,137 A | 4/1997 | Powers et al. |
| 5,701,175 A | 12/1997 | Kostizak et al. |
| 5,702,059 A | 12/1997 | Chu et al. |
| 5,714,745 A | 2/1998 | Ju et al. |
| 5,745,176 A | 4/1998 | Lebens |
| 5,763,864 A | 6/1998 | O'Hagan et al. |
| 5,783,811 A | 7/1998 | Feng et al. |
| 5,793,033 A | 8/1998 | Feng et al. |
| 5,811,774 A | 9/1998 | Ju et al. |
| 5,811,784 A | 9/1998 | Tausch et al. |
| 5,811,828 A | 9/1998 | Laser |
| 5,815,200 A | 9/1998 | Ju et al. |
| 5,818,028 A | 10/1998 | Meyerson et al. |

(Continued)

FOREIGN PATENT DOCUMENTS

| | | |
|---|---|---|
| EP | 0171816 A1 | 2/1986 |
| EP | 2202666 A2 | 6/2010 |

OTHER PUBLICATIONS

Milgrom, Benjamin et al. Novel Approach for Extending the Depth of Field of Barcode Decoders by Using RGB Channels of Information, dated Aug. 2, 2010, vol. 18, No. 16, Optics Express 17027 (13 pages).

(Continued)

*Primary Examiner* — Tuyen K Vo
(74) *Attorney, Agent, or Firm* — Heslin Rothenberg Farley & Mesiti P.C.

(57) ABSTRACT

There is set forth herein an indicia reading terminal comprising an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength. The indicia reading terminal can include an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range.

25 Claims, 12 Drawing Sheets

U.S. PATENT DOCUMENTS

| | | | |
|---|---|---|---|
| 5,834,754 | A | 11/1998 | Feng et al. |
| 5,949,057 | A | 9/1999 | Feng |
| 5,969,321 | A | 10/1999 | Danielson et al. |
| 6,042,013 | A | 3/2000 | Fork |
| 6,123,263 | A | 9/2000 | Feng |
| 6,164,544 | A | 12/2000 | Schwartz et al. |
| 6,179,208 | B1 | 1/2001 | Feng |
| 6,330,974 | B1 | 12/2001 | Ackley |
| 6,345,765 | B1 | 2/2002 | Wiklof |
| 6,415,073 | B1 * | 7/2002 | Cappiello et al. ............... 385/24 |
| 6,431,452 | B2 | 8/2002 | Feng |
| 6,488,390 | B1 | 12/2002 | Lebens et al. |
| 6,601,768 | B2 | 8/2003 | McCall et al. |
| 6,628,327 | B1 * | 9/2003 | Aoki et al. ................. 348/221.1 |
| 6,808,287 | B2 | 10/2004 | Lebens et al. |
| 6,832,725 | B2 | 12/2004 | Gardiner et al. |
| 7,100,830 | B2 | 9/2006 | Murata et al. |
| 7,224,540 | B2 | 5/2007 | Olmstead et al. |
| 7,270,274 | B2 | 9/2007 | Hennick et al. |
| 7,278,573 | B2 | 10/2007 | Murata et al. |
| 7,296,751 | B2 | 11/2007 | Barber et al. |
| 7,306,155 | B2 | 12/2007 | Hennick et al. |
| 7,478,754 | B2 | 1/2009 | Gurevich et al. |
| 7,483,417 | B2 | 1/2009 | Farris et al. |
| 7,500,614 | B2 | 3/2009 | Barber et al. |
| 7,533,824 | B2 | 5/2009 | Hennick et al. |
| 7,548,274 | B2 | 6/2009 | Chaleff et al. |
| 7,557,920 | B2 | 7/2009 | Lebens |
| 7,595,826 | B2 * | 9/2009 | Aoki et al. .................... 348/273 |
| 7,626,769 | B2 | 12/2009 | Olmstead et al. |
| 7,664,097 | B2 | 2/2010 | White et al. |
| 2004/0080640 | A1 * | 4/2004 | Aoki et al. .................... 348/272 |
| 2006/0060653 | A1 | 3/2006 | Wittenberg et al. |
| 2006/0171041 | A1 | 8/2006 | Olmstead et al. |
| 2006/0274171 | A1 * | 12/2006 | Wang ............................ 348/294 |
| 2007/0091332 | A1 * | 4/2007 | Nunnink ....................... 358/1.6 |
| 2010/0097487 | A1 | 4/2010 | Marom et al. |
| 2010/0123009 | A1 * | 5/2010 | Cherry .......................... 235/469 |
| 2010/0213259 | A1 * | 8/2010 | Gao .............................. 235/469 |
| 2011/0222763 | A1 * | 9/2011 | Milgrom et al. .............. 382/165 |

OTHER PUBLICATIONS

Apr. 23, 2012 Search Report in European Application No. 12153179.2.

* cited by examiner

TERMINAL HAVING OPTICAL IMAGING ASSEMBLY

FIELD OF THE INVENTION

The present invention relates in general to optical based registers, and particularly is related to an image sensor based indicia reading terminal.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboards and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Keyboard and display equipped indicia reading terminals are available in a form in which the keyboard and display are commonly provided by a display having an associated touch panel. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 10 is a reduced resolution representation of a frame of image data read out from a Bayer pattern image sensor pixel array;

FIG. 11 is a reduced resolution representation of red pixel positions of a frame of image data;

FIG. 12 is a reduced resolution representation of an interpolated red frame;

FIG. 13 is a reduced resolution representation of an interpolated green frame;

FIG. 14 is a reduced resolution representation of an interpolated blue frame;

FIG. 16 is a reduced resolution representation of a frame of image data read out of an image sensor pixel array as depicted in FIG. 15;

FIG. 17 is a reduced resolution representation of a frame of image data read out from an image sensor pixel array having a two dimensional regions of different color sets;

SUMMARY OF THE INVENTION

There is set forth herein an indicia reading terminal comprising an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength. The indicia reading terminal can include an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range.

DETAILED DESCRIPTION OF THE INVENTION

Figure 1:
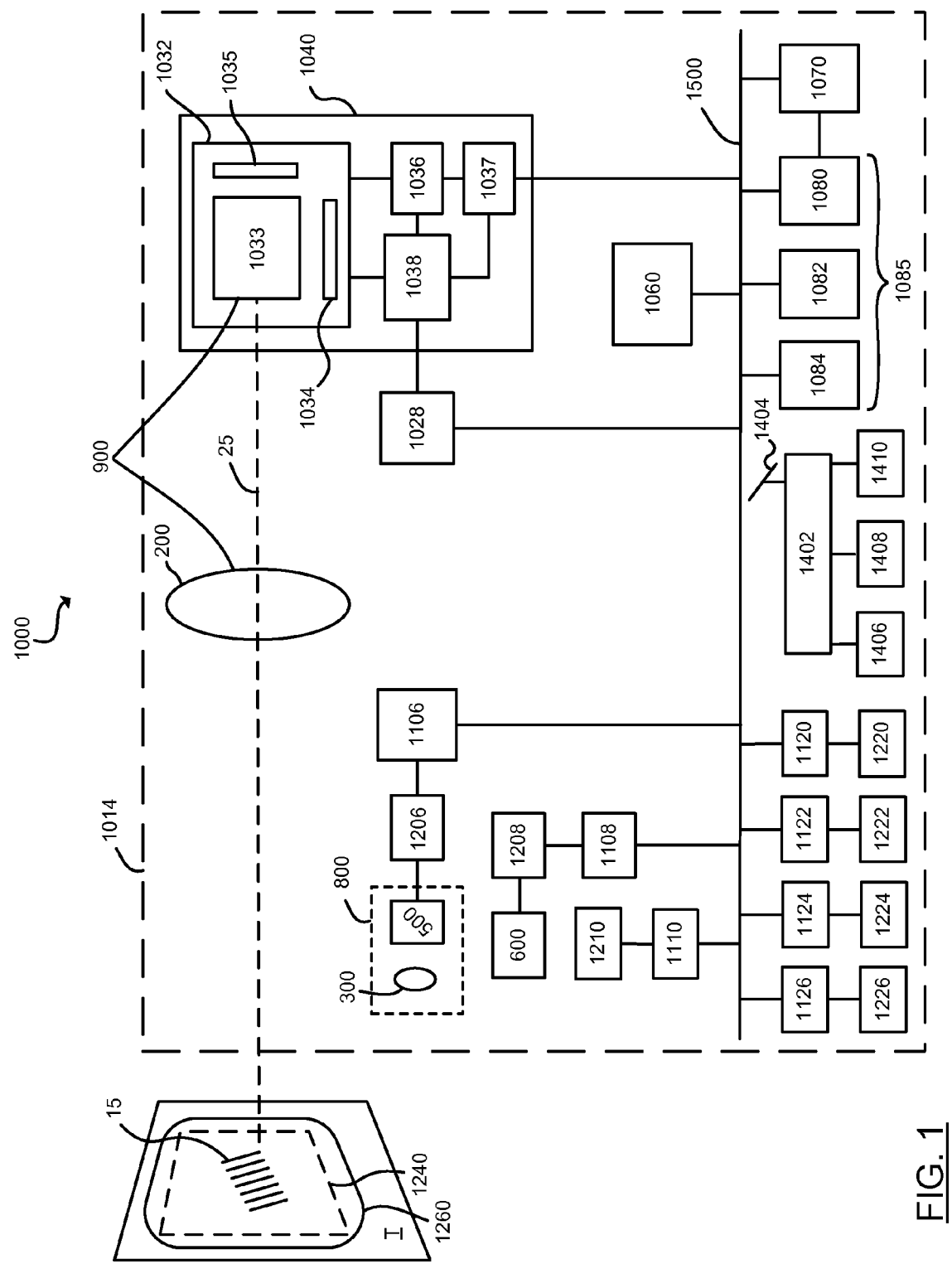
FIG. 1 is a block diagram of an indicia reading terminal.

There is set forth herein as shown in FIG. 1 an indicia reading terminal 1000 comprising an image sensor pixel array 1033 having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength. The indicia reading terminal 1000 can include an optical imaging assembly 200 for focusing imaging light rays onto the image sensor pixel array, the optical imaging assembly 200 being adapted so that for light rays of the first wavelength the optical imaging assembly 200 has a first focus range and for light rays of the second wavelength the optical imaging assembly 200 has a second focus range.

With use of an optical imaging assembly 200 having different focus ranges for different wavelengths, the indicia reading terminal is effectively simultaneously focused at more than one focus distance at a given time, and image data representing light incident at one of the first set or second set of pixels can, at a given time, represent an image in better focus than image data representing light incident at another of the first or second set of pixels. By attempting to decode decodable indicia utilizing image data representing light incident at the first set and the second set, a time to decode a decodable indicia at an unknown distance from a terminal can be improved relative to a time to decode utilizing a terminal having a multiple setting optical imaging assembly and switching the optical imaging assembly between lens settings.

Indicia reading terminal 1000 can include an image sensor 1032 comprising a multiple pixel image sensor pixel array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor pixel array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor pixel array 1033 can be a hybrid monochrome and color image sensor pixel array having a first subset of monochrome pixels without color filter elements and a second subset of color pixels having color sensitive filter elements. In one example, image sensor integrated circuit 1040 can incorporate a Bayer pattern filter, so that defined at the image sensor pixel array 1033 are red pixels at red pixel positions, green pixels at green pixel positions, and blue pixels at blue pixel positions. Image sensor pixel array can be an M column and N row (M×N) image sensor pixel array 1033. "Column" and "row" herein are regarded as arbitrary designations. Thus, a "column" according to a manufacturer of an image sensor pixel array 1033 can be regarded as either a "row" or "column" herein. Frames that are provided utilizing such an image sensor pixel array incorporating a Bayer pattern can include red pixel values at red pixel positions, green pixel values at green pixel positions, and blue pixel values at blue pixel positions. In an embodiment incorporating a Bayer pattern image sensor pixel array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging subsystem 900 of terminal 1000 can include image sensor pixel array 1033 and optical imaging assembly 200 for focusing imaging light rays onto image sensor pixel array 1033 of image sensor 1032.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, optical imaging assembly 200 can be adapted for focusing an image of a decodable indicia 15 located within a field of view 1240 on a substrate, T, onto image sensor pixel array 1033. A size in target space of a field of view 1240 of terminal 1000 can be varied in a number of alternative ways. A size in target space of a field of view 1240 can be varied, e.g., by changing a terminal to target distance, changing an imaging lens assembly setting, changing a number of pixels of image sensor pixel array 1033 that are subject to read out. Imaging light rays can be transmitted about imaging axis 25. Optical imaging assembly 200 can be adapted to be capable of multiple focus ranges and multiple planes of optimum focus (best focus distances). In one embodiment, optical imaging assembly 200 is a stationary optical imaging assembly devoid of a mechanism for changing a lens setting. In terminal 1000, different focus ranges can be yielded without changing of a lens setting of optical imaging assembly 200.

Figure 3:
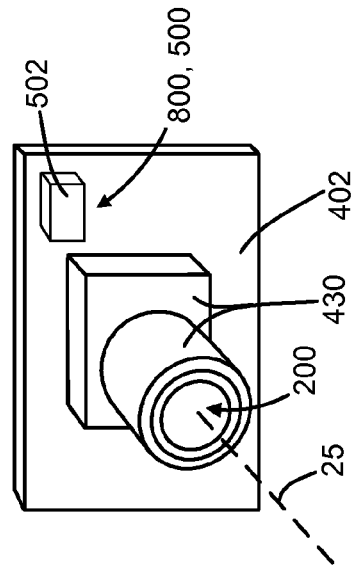
FIG. 3 is a perspective view of an exemplary imaging module.
Figure 2:
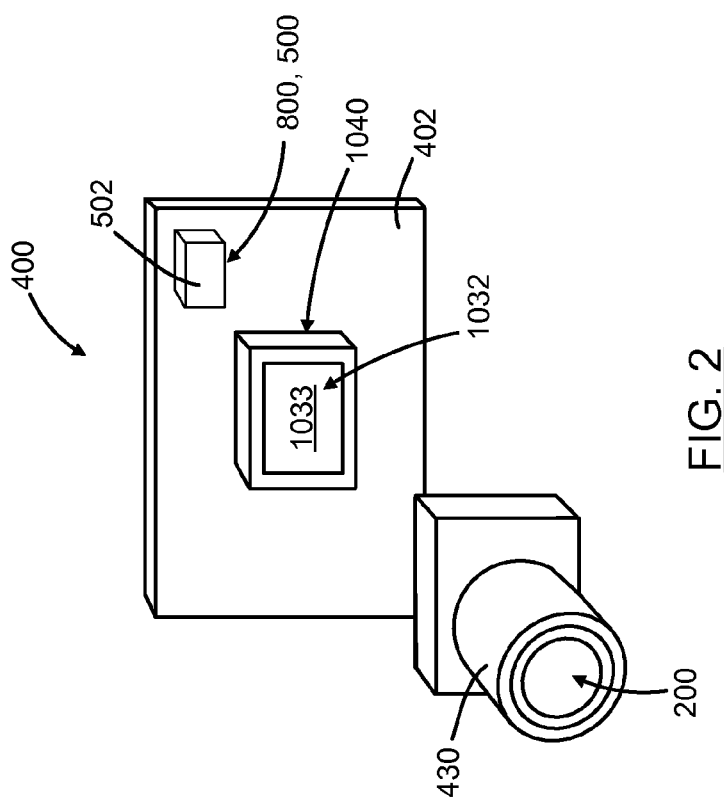
FIG. 2 is an exploded perspective view of an exemplary imaging module.

Terminal 1000 can include an illumination subsystem 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. A physical form view of an example of an illumination subsystem 800 is shown in FIGS. 2 and 3. As shown in FIGS. 2 and 3, an imaging module 400 can be provided having a circuit board 402 carrying image sensor 1032, that defines image sensor pixel array 1033, integrated circuit 1040 having an optical imaging assembly 200 disposed in support 430 disposed on circuit board 402. In the embodiment of FIGS. 2 and 3, illumination subsystem 800 has a light source bank 500 provided by single light source 502. In another embodiment, light source bank 500 can be provided by more than one light source. In one embodiment, illumination subsystem 800 can include, in addition to light source bank 500, an illumination lens assembly 300, as is shown in the embodiment of FIG. 1. In addition to or in place of illumination lens assembly 300 illumination subsystem 800 can include alternative light shaping optics, e.g. one or more diffusers, mirrors and prisms.

In one embodiment, one or more light source of light source bank 500 can emit light in the visible spectrum. In one embodiment, a one or more light source of light source bank 500 emits white light. Light source bank 500 can otherwise be configured to emit light in a wavelength range which in one embodiment exceeds 20 nm, in another embodiment 100 nm and in another embodiment 200 nm. In one embodiment, light source bank 500 can include first light source emitting light in a first visible color band and a second light source emitting light in a second visible color band so that a wavelength range of emitted light is delimited by the lower wavelength limit of the first visible color band and the higher wavelength limit of the second visible color band. Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with CPU 1060.

Figure 4:
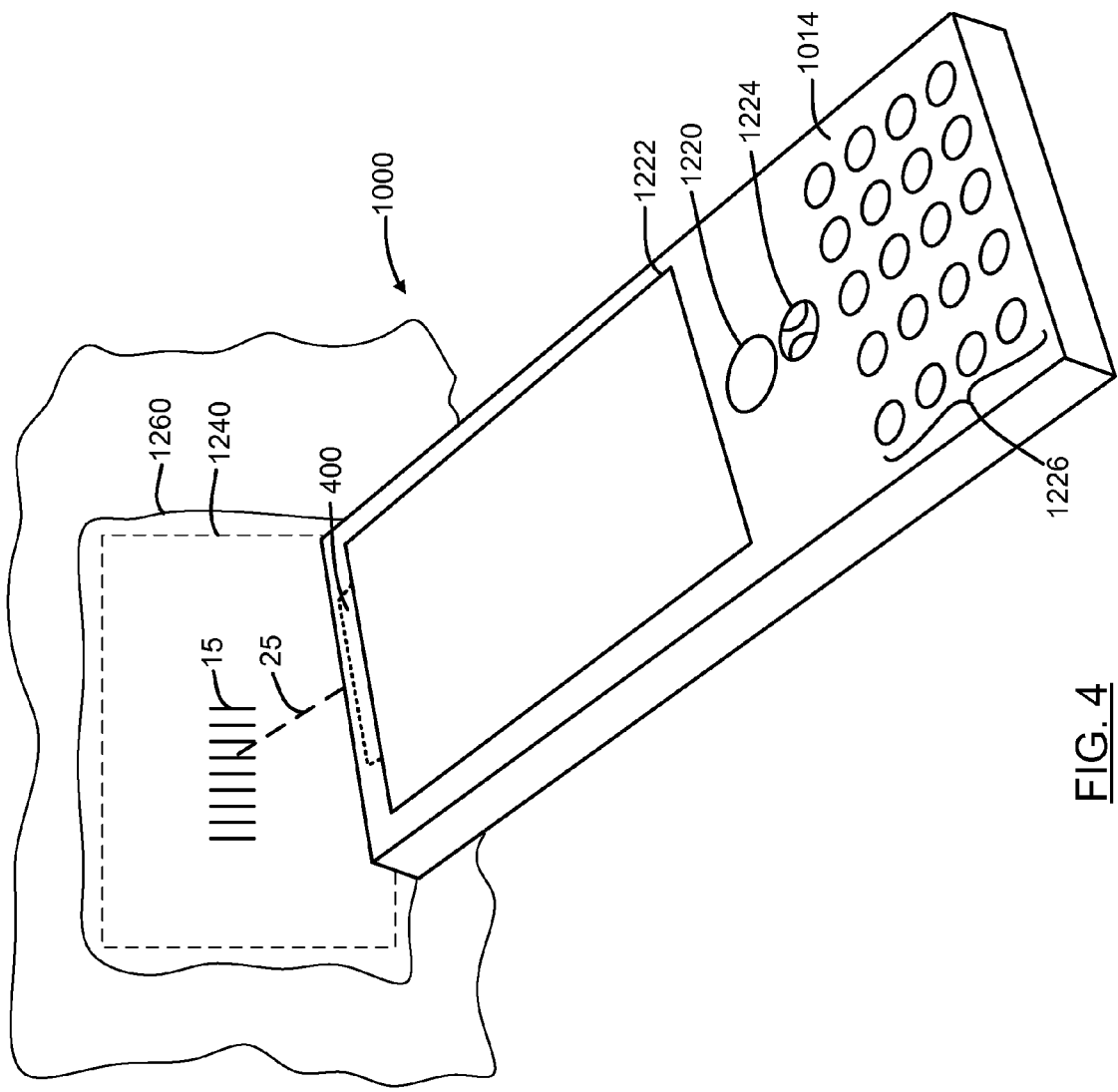
FIG. 4 is a perspective physical form view of an indicia reading terminal.

In use, terminal 1000 can be oriented by an operator with respect to a target, T, (e.g., a piece of paper, a package, another type of substrate) bearing decodable indicia 15 in such manner that illumination pattern 1260 is projected on a decodable indicia 15. In the example of FIGS. 1 and 4, decodable indicia 15 is provided by a 1D bar code symbol. Decodable indicia 15 could also be provided by a 2D bar code symbol or optical character recognition (OCR) characters.

Light source bank electrical power input unit 1206 can provide energy to light source bank 500. Power input unit 1206 can be coupled to system bus 1500 for communication with CPU 1060 via interface circuit 1106. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include power supply 1402 that supplies power to a terminal power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410).

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor pixel array 1033 (typically in the form of analog signals) conversion of the image information into digital format and then storage of the image information after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1108 for coupling electrical power input unit 1208 to system bus 1500, interface circuit 1106 for coupling illumination light source bank power input unit 1206 to system bus 1500, and interface circuit 1120 for coupling trigger 1220 to system bus 1500. Terminal 1000 can also include a display 1222 coupled to system bus 1500 and in communication with CPU 1060, via interface 1122, pointer mechanism 1224 in communication with CPU 1060 via interface 1124 connected to system bus 1500 as well as keyboard 1226 in communication with CPU 1060 via interface 1126 connected to system bus 1500. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor pixel array controls and illumination subsystem controls.

A succession of frames of image data that can be captured and subject to the described processing can be full frames (including pixel values corresponding to each pixel of image sensor pixel array 1033 or a maximum number of pixels read out from image sensor pixel array 1033 during operation of terminal 1000). A succession of frames of image data that can be captured and subject to the described processing can also be "windowed frames" comprising pixel values corresponding to less than a full frame of pixels of image sensor pixel array 1033. A succession of frames of image data that can be captured and subject to the described processing can also comprise a combination of full frames and windowed frames. A full frame can be read out for capture by selectively addressing pixels of image sensor 1032 having image sensor pixel array 1033 corresponding to the full frame. A windowed frame can be read out for capture by selectively addressing pixels of image sensor 1032 having image sensor pixel array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Further aspects of terminal 1000 in one embodiment are described with reference again to the physical form view of FIG. 4. Trigger 1220, display 1222, pointer mechanism 1224, and keyboard 1226 can be disposed on a common side of a hand held housing 1014 as shown in FIG. 4. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor. Imaging module 400 including image sensor pixel array 1033 and imaging optical imaging assembly 200 can be incorporated in hand held housing 1014.

Figure 5:
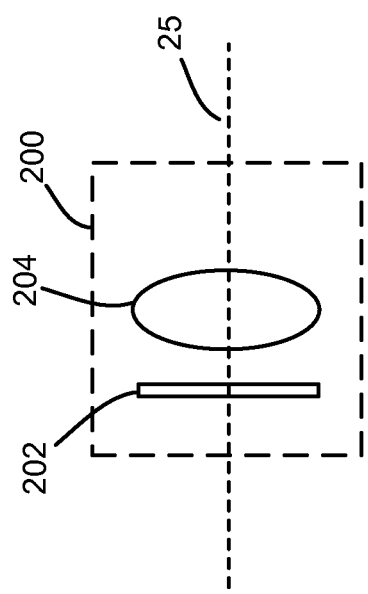
FIG. 5 is a schematic diagram of an optical imaging assembly.
Figure 6:
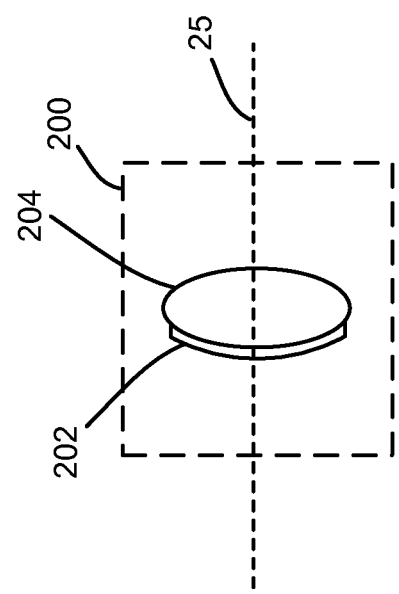
FIG. 6 is a schematic diagram of an optical imaging assembly.

Regarding optical imaging assembly 200 as shown in FIGS. 5 and 6, optical imaging assembly 200 can be adapted so that for light rays of a first wavelength the optical imaging assembly 200 has a first focus range and further so that for light rays of a second wavelength the optical imaging assembly 200 has a second focus range, and further so that for light rays of a third, fourth and Nth wavelength, optical imaging assembly 200 has a third, fourth and Nth focus range. Focus ranges of optical imaging assembly 200 at which a decodable indicia is in sufficient focus to enable decoding can overlap. A first focus range can be, e.g., 0 cm to 20 cm and a second focus range can be 15 cm to 100 cm. In another example, a first focus range can be 0 cm to 50 cm and a second focus range can be 40 cm to 500 cm. In one embodiment, optical imaging assembly 200 can comprise a polychromatic phase mask 202. Referring to FIG. 5, optical imaging assembly 200 can comprise polychromatic phase mask 202 with another optical element 204. Polychromatic phase mask 202 can be decoupled with respect to optical element 204 or can be integrally formed with optical element 204 as is indicated in FIG. 6.

Figure 7:
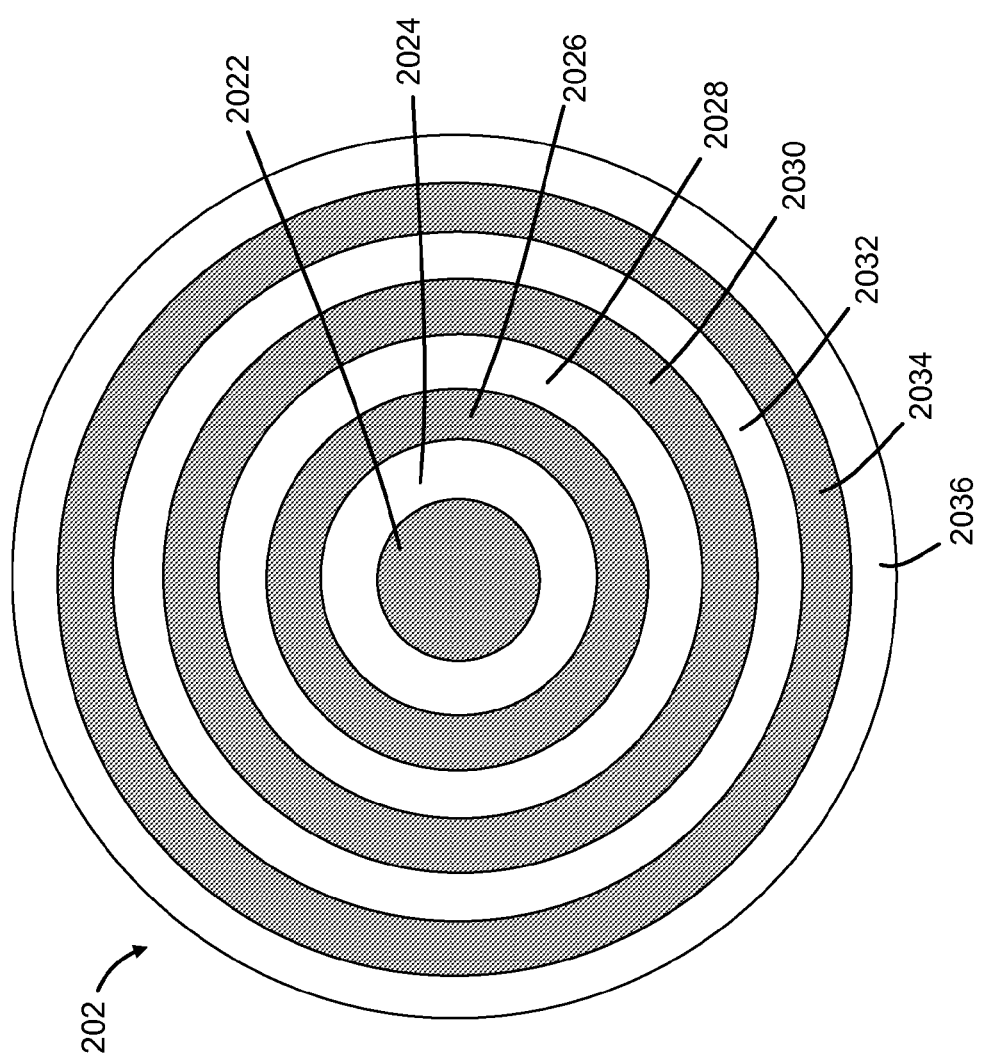
FIG. 7 is a schematic diagram of a polychromatic phase mask.

Details of polychromatic phase mask 202 in one embodiment are described with reference to FIG. 7. Polychromatic phase mask 202 can comprise opaque central circle 2022 as well as concentric rings 2024, 2026, 2028, 2030, 2032, 2034, and 2036, including non-affecting ring 2024, phase shifting ring 2026, non-affecting ring 2028, phase shifting ring 2030, non-affecting ring 2032, phase shifting ring 2034, and non-affecting ring 2036. Non-affecting rings 2024, 2028, 2032, 2034, 2036 do not affect the phase or amplitude of light passing through phase mask 202. Phase shifting rings 2026, 2030, 2034 can shift a phase of light passing through phase mask 202. Phase mask 202 can include a greater number or a lesser number of rotationally symmetrical regions. Polychromatic phase mask 202 can include multiple rotationally symmetric regions wherein the multiple rotationally symmetric regions are shaped and positioned such as to define a modulation transfer function that is characterized by a substantially uniform response over a spatial frequency range and over a predefined optimum focus range. A phase mask 202 as set forth herein can have a variable transmission which can be one of wavelength independent or wavelength dependent (i.e., can have a color component). Phase mask 202 can be provided e.g., by removing material, e.g., by etching for providing thinner layers or adding material, e.g., by depositing for providing thicker layers. Color sensitivity of phase mask 202 can be achieved by adjusting the thickness of various regions of mask 202 relative to wavelengths of interest such that an appropriate phase differential is achieved over a desired field depth. In addition or alternatively, color sensitivity of phase mask 202 can be achieved by associating different wavelength selective color filters to various different regions of phase mask 202 having different associated phase shifts. A modulation transfer function can be optimized over a desired depth of field so that for a first wavelength optical imaging assembly 200 has a first focus range and further so that for light rays of a second wavelength, optical imaging assembly 200 has a second focus range.

Figure 8:
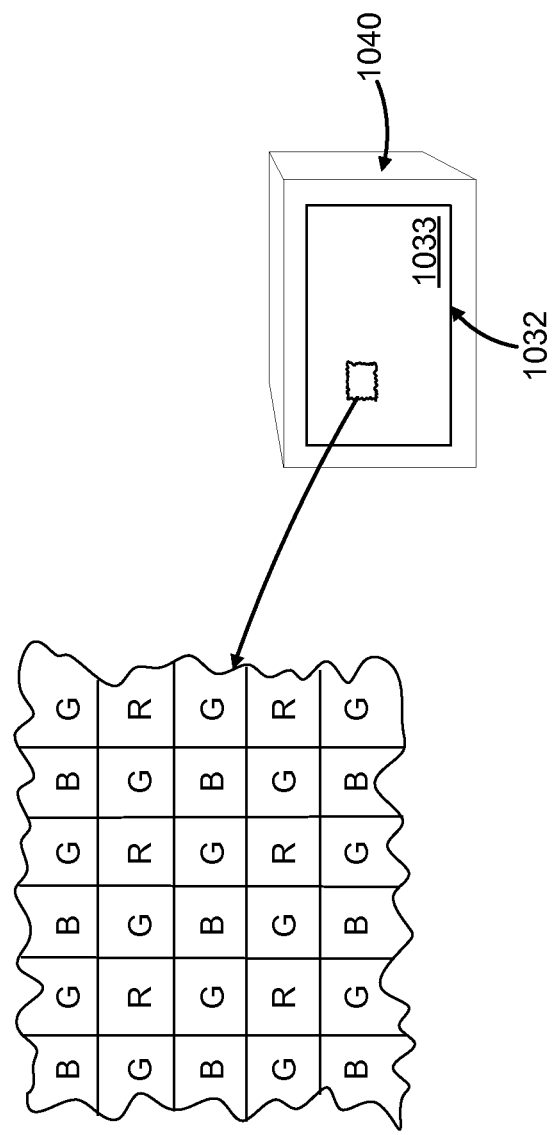
FIG. 8 is a schematic diagram of an image sensor integrated circuit having a Bayer pattern image sensor pixel array.

Referring to FIG. 8, aspects of image sensor 1032 in one embodiment are described in further detail. Image sensor pixel array 1033 in one embodiment, can be a Bayer pattern image sensor pixel array having a filter pattern as shown in FIG. 8. It has been described that image sensor pixel array 1033 can have a first set of pixels selectively transmitting light at a first wavelength and a second set of pixels selectively transmitting light at a second wavelength. The first and second wavelength can be narrow wavelength bands corresponding to a particular color of the visible color spectrum. Referring to the image sensor pixel array 1033, the first set of pixels can be regarded as one of the set of red pixels of array 1033 (designated with "R") the set of green pixels of array 1033 (designated with "G") or the set of blue pixels of array 1033 (designated with "B") and the second set of pixels of array 1033 can be regarded as another of a set of red, green and blue set pixels of image sensor pixel array 1033. A third set of pixels of array 1033 can be regarded as a remaining set of pixels of image sensor pixel array 1033 (red set, green set or blue set). A set of pixels having filters filtering in a particular visible color wavelength band can be regarded as a color set of pixels. In one embodiment, indicia reading terminal 1000 is operative to capture a frame of image data including image data corresponding to at least one of the first set of pixels or the second set of pixels, or the third set of pixels, wherein the indicia reading terminal is further operative for selectively utilizing image data of the frame corresponding to the first set of pixels for attempting to decode a decodable indicia. In one embodiment, image sensor pixel array 1033 can include a Bayer pattern of pixels having the filter pattern as shown in FIG. 8. Indicia reading terminal 1000 can be operative for capture of a frame of image data having both image data representing light on pixels of the first color set and image data representing light incident on pixels of the second color set. Indicia reading terminal 1000 can also be operative for capture of a frame of image data having image data representing light incident on one of the first color set or second color set of pixels. For example, indicia reading terminal 1000 can be operative for selectively addressing and reading out image data corresponding to one of the first set and the second set without addressing for readout pixels of the remaining set.

Figure 9:
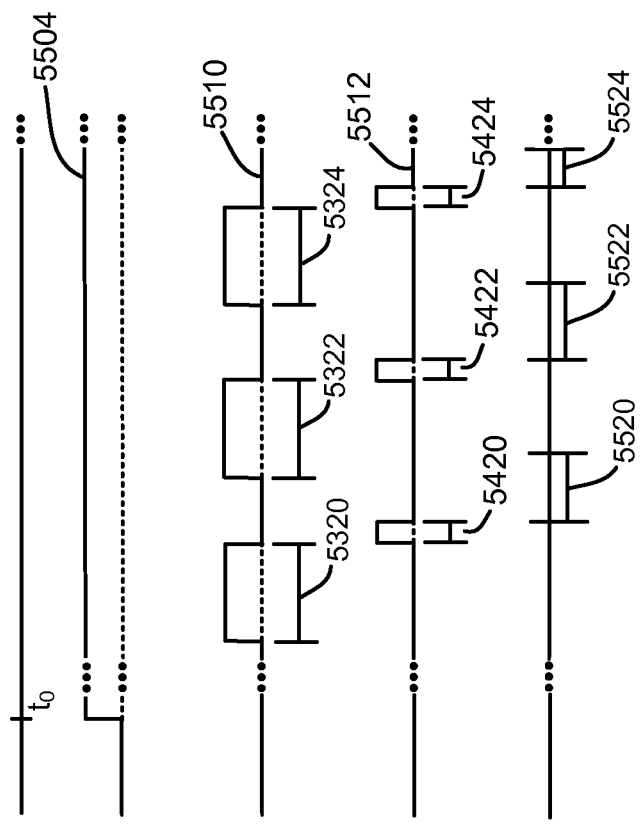
FIG. 9 is a timing diagram illustrating operation of an indicia reading terminal.

A timing diagram illustrating operation of indicia reading terminal 1000 for capture of three successive frames, N−1, N, N+1, is shown in FIG. 9. With reference to the timing diagram of FIG. 9, signal 5504 indicates a trigger signal. Trigger signal 5504 can be made active by actuation of a trigger 1220. Responsively to activation of trigger signal 5504, indicia reading terminal 1000 can capture a plurality of frames of image data.

Referring to the signal 5510, signal 5510 indicates exposure periods of indicia reading terminal 1000 with logic high periods of signal 5510 indicating exposure on periods and periods intermediate the logic high periods off periods of exposure. In an alternative embodiment, image sensor pixel array 1033 can be subject to continuous exposure as in a rolling shutter configuration. In the timing diagram of FIG. 9, periods 5320, 5322, 5324 indicate exposure periods of image sensor pixel array 1033. Indicia reading terminal 1000 can be operative to capture a frame of image data by reading out a frame of image data subjecting the image data of the frame to conversion, and storing the frame into memory 1080. Where a succession of frames are captured, the storing of frames can comprise buffering frames into a buffer memory location. After image sensor pixel array 1033 is exposed, charges accumulated at pixels of array 1033 can be read out, converted into digitized format, and stored into working volatile memory wherein respective frames can be subject to processing by CPU 1060.

With further reference to the timing diagram of FIG. 9, signal 5512 indicates readout signal having read out periods 5420, 5422, 5424 wherein charges accumulated at pixels of image sensor pixel array 1033 can be read out for conversion and storage to non-volatile memory 1080. Further reference to the timing diagram of FIG. 9, periods 5520, 5522, 5524 indicate processing periods of CPU 1060. During processing periods 5520, 5522, 5524, CPU 1060 can be subjecting captured frames of image data to processing for attempting to decode a decodable indicia. With reference to the timing diagram of FIG. 9, period 5320 can be an exposure period for frame N−1, period 5420 can be a readout period for frame N−1 and period 5520 can be a processing period for frame N−1, periods 5322, 5422 and 5522 can be exposure, readout and processing periods for frame N, and periods 5324, 5424, 5524 can be exposure, readout and processing periods for frame N+1.

In another aspect, terminal 1000 can be operative so that responsively to activation of a trigger signal 5504 the indicia reading terminal captures a first frame of image data and a second frame of image data and selectively utilizes image data of the first frame representing light incident on the first color set of pixels for attempting to decode a decodable indicia and further selectively utilizes image data of the second frame of image data representing light incident on the second color set of pixels for attempting to decode decodable indicia In one example of selective utilization of frame image data, the indicia reading terminal 1000 can selectively address image data of the first color set or second color set. For example, for capture of frame N−1 wherein image sensor pixel array 1033 is a Bayer pattern image sensor pixel array, terminal 1000 can selectively address pixels of only one of the red set, green set, or blue set pixels of the array and for capture of frame N+1, terminal 1000 can selectively address for readout pixels of only one of the red set, green set, or blue set of pixels of the array, where the color set is a different color set than the color set for frame N−1.

In another example of selective utilization of frame image data for attempting to decode a decodable indicia, terminal 1000 can selectively process image data of one of the first set or second set.

In one example the selective processing of image data can include interpolation of pixel values at positions not corresponding to a certain color set utilizing image data of the certain color set. For frames N−1, N and N+1, terminal 1000 can capture windowed frames comprising image data of a single set. However, in another embodiment, frames N−1, N and N+1 can be windowed or full frames having image data representing light incident on pixels of more than one color set of pixels. For example frames N−1, N, and N+1 can be full frames each having, red, green, and blue pixels in the case image sensor pixel array 1033 is a Bayer pattern image sensor pixel array 1033. A representation of a full frame of image data is shown in FIG. 9.

Figures 10, 11, 12, 13, 14:
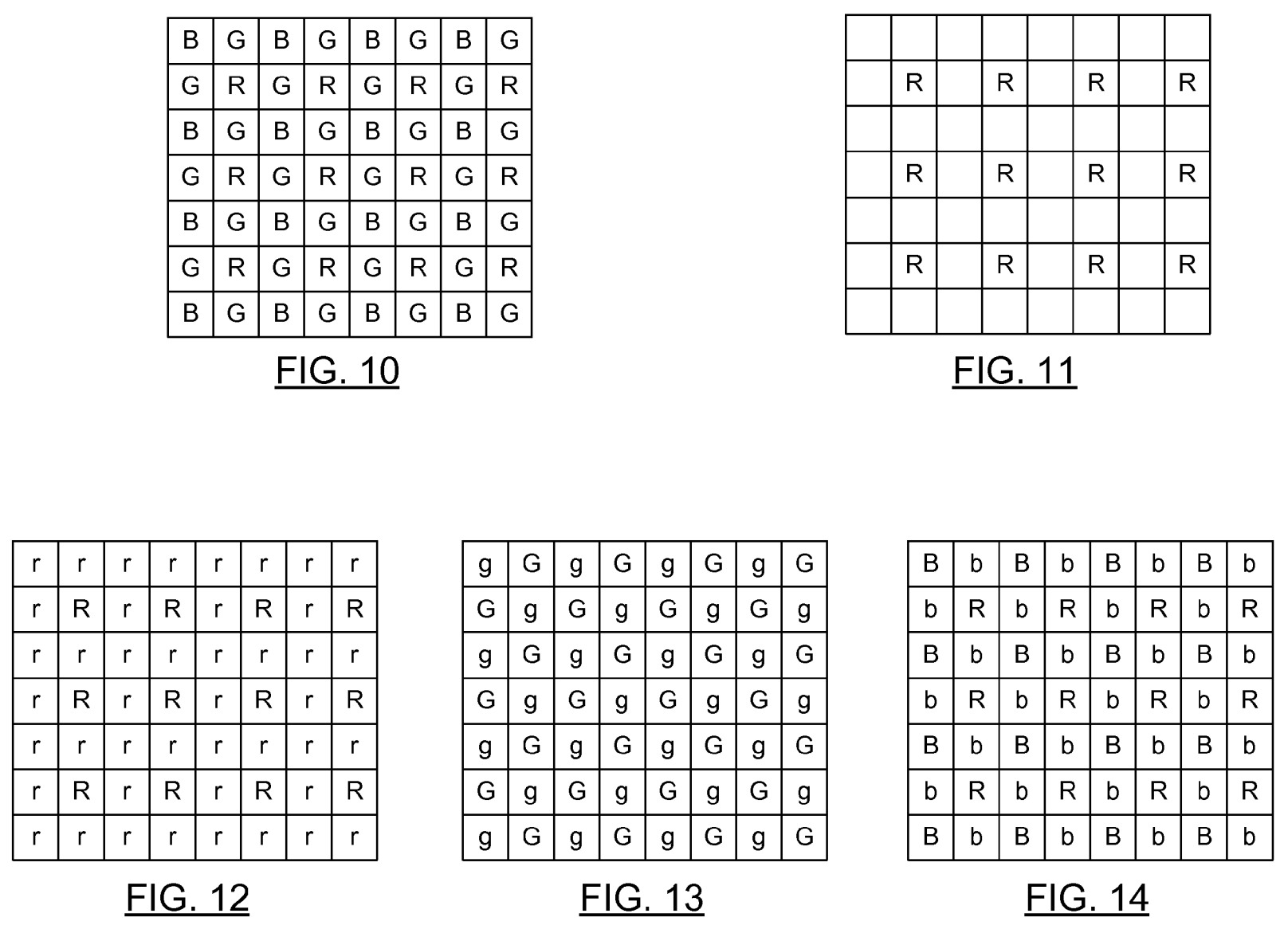

For decoding a frame of image data as shown in FIG. 10 having multiple pixels of different color sets, terminal 1000 can be operative to attempt to decode a decodable indicia utilizing image data representing light incident on each color set of pixels separately. Terminal 1000 can provide an interpolated red frame and attempt to decode utilizing the interpolated red frame, can provide an interpolated green frame and can attempt to decode utilizing the interpolated green frame, and a can provide an interpolated blue frame and attempt to decode utilizing the interpolated blue frame.

A method for providing an interpolated red frame is described with reference to FIGS. 11 and 12. FIG. 11 is a representation of full frame with pixel positions of pixels other than red pixels represented as blanks or "missing pixel" positions. Terminal 1000 can interpolate red pixel values at the missing pixel positions utilizing the pixel values at the original red pixel position designated with the capital letter R in FIG. 11. For each missing pixel position, a red pixel value can be determined as the average of nearest neighbor red pixel values weighted by the distance to the missing pixel position. A representation of an output interpolated red pixel frame is shown in FIG. 12 with original red pixel positions represented with the capital letter R and with interpolated pixel values represented by the lower case letter "r".

Interpolated green pixel frames and an interpolated blue pixel frames can be provided in the same manner as the interpolated red frame as set forth in FIGS. 11 and 12. A set of red, green, and blue interpolated frames is shown in FIGS. 12, 13 and 14. It will be seen that since optical imaging assembly 200 includes a different focus range for light of different wavelengths, the red, green, and blue interpolated frames as represented in FIGS. 12-14, can be of different quality as determined by their sharpness as a function of focus. Better focused frames can have increased sharpness. Each of the interpolated frames can be provided with a focus score. The focus score can be determined by application of the following autocorrelation function using a sample of interest lines throughout the frames.

A focus score, in one example, can be calculated by selecting a sample of lines, e.g., a sample of rows and/or columns of image data and subjecting the sample of pixel values to the following auto correlation equation.

$$S_{path} = \Sigma(I_n - I_{n-1})^2 \qquad \text{Equation 1}$$

where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path} = \Sigma |I_n - I_{n-1}| \qquad \text{Equation 2}$$

It is seen that by application of Equation 1 or 2, frames of image data having sharper contrast features will generally be attributed higher focus scores.

In one embodiment, for each of the interpolated red, green, and blue frames, terminal 1000 can attempt to decode a decodable indicia utilizing each of the frames of FIGS. 12-14. In another embodiment, terminal 1000 can utilize the frame having the highest focus score as the frame for subjecting to a decode attempt.

Figure 15:
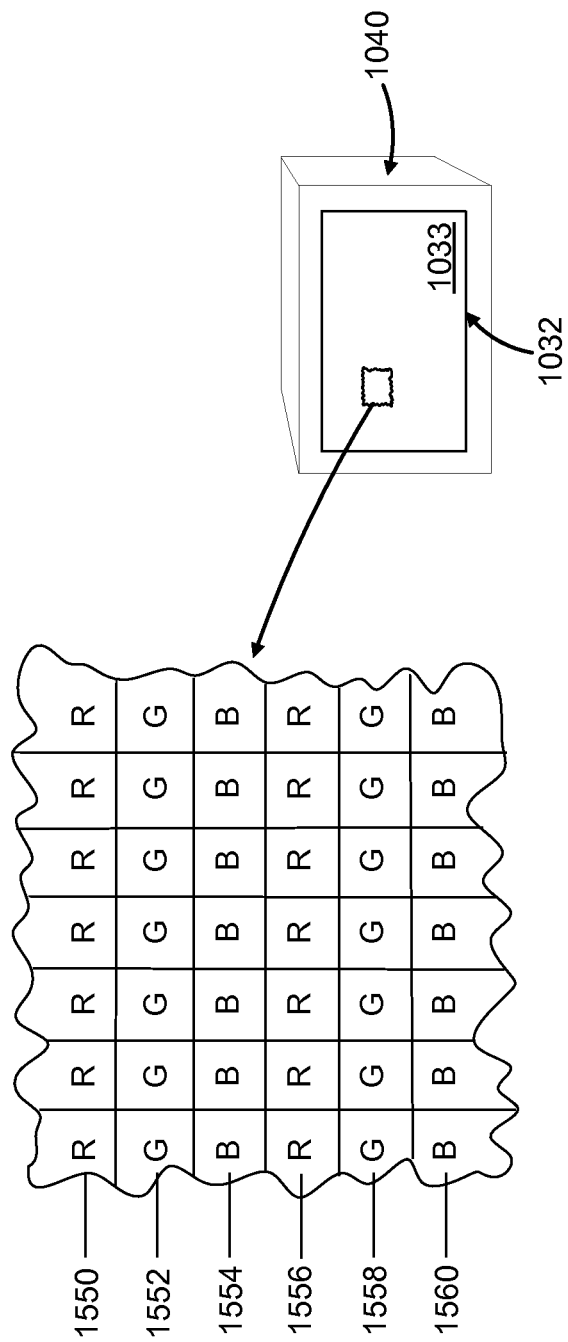
FIG. 15 is a schematic diagram of an image sensor integrated circuit having an image sensor pixel array with alternating rows of different color sets.

In embodiments described herein image sensor pixel array 1033 is a Bayer pattern image sensor pixel array having a Bayer pattern filter array as shown in FIG. 8. In another embodiment, image sensor pixel array 1033 can have an alternative filter pattern. In the embodiment of FIG. 15, image sensor pixel array 1033 has a filter pattern characterized by alternating rows of different color filters. Rows 1550, 1556 consist of red pixels having color filters, rows 1552, 1558 consist of green pixels having green color filters, while rows 1554, 1560 consist of blue pixels having blue color filters.

Figures 16, 17:
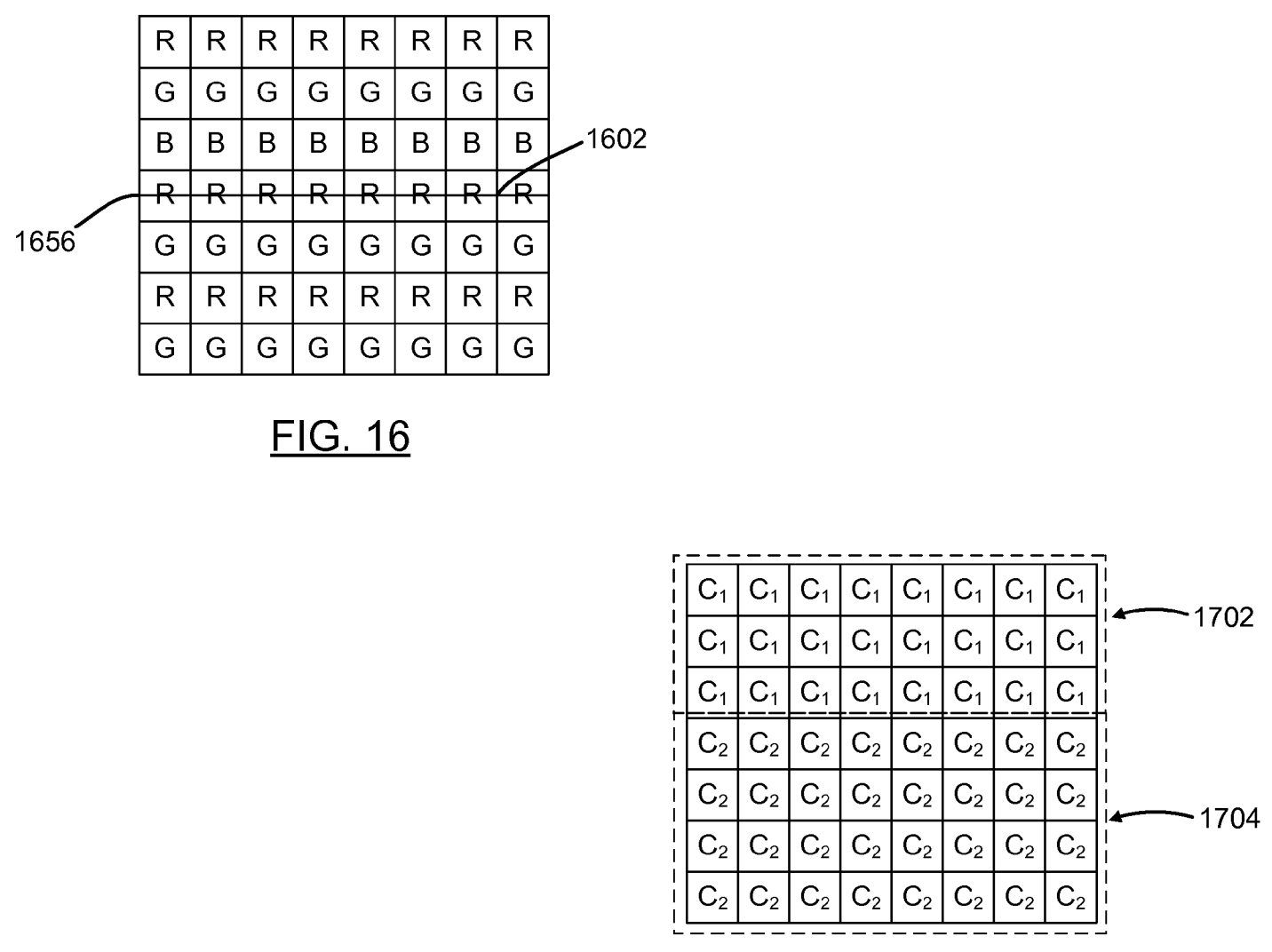

A full frame of image data output from the image sensor pixel array 1033 can have the pixel position pattern as shown in FIG. 16. One example of selective processing of image data of one color set of pixels includes interpolation of pixel values. In another example of selective processing of image data a scan line that is utilized for locating or decoding decodable image data is restricted from including image data representing light incident on pixels external to a certain color set of pixels. Referring to FIG. 16 the scan line 1602 is selectively restricted to pixel positions representing light incident on the red pixel set. With use of the image sensor pixel array 1033 of FIG. 15 frames of image data can be output having an original pixel resolution (not relying on interpolation) in one dimension that corresponds to the pixel resolution of image sensor pixel array 1033. Configured as described, a spatial sampling of image data utilizing an image sensor pixel array 1033 having the filter pattern as shown in FIG. 15 can be equivalent to a spatial sampling of image data utilizing a monochrome image sensor pixel array 1033. Providing a row (e.g., one or more row) of pixels of image sensor pixel array 1033 with adjacent (contiguous) pixels of the row (e.g., the entire row of a common color set) facilitates improved spatial sampling of terminal 1000 and improved reading of finely dimensioned bar codes. While scan lines such as scan line 1602 can be utilized for decoding of one dimensional bar codes represented in a frame as depicted in FIG. 16, it will be understood that a frame as depicted in FIG. 16 like a Bayer pattern frame depicted in FIG. 10 can be subject to interpolation for providing an interpolated frame having image data representing light incident on a single color set of pixels. The interpolated frame can be subject to a decode attempt for attempting to decode a decodable indicia in the form of a one dimensional or a two dimensional bar code symbol. In a variation of the image sensor pixel array 1033 as shown in FIG. 15, image sensor pixel array 1033 can have a high aspect ratio, e.g., in one embodiment ≧5:1, in one embodiment ≧10:1, in one embodiment 20≧1, in one embodiment ≧50:1 favoring the horizontal dimension. In one specific embodiment, image sensor pixel array 1033 can have an M column×3 row (M×3) array of pixels, M≧100, where each of the three rows is of a certain color set (e.g., red, green, or blue). In another embodiment, image sensor pixel array 1033 can have an M×9 array of pixels, M≧100 with three rows of a first color set, three rows of a second color set, and three rows of a third color set.

In another example of selective processing the indicia reading terminal can restrict image data examined for attempting to decode the decodable image data to image data representing light incident on a certain color set of pixels. For example as shown in FIG. 17, a frame read out from an image sensor pixel array 1033 having two dimensional (M×N regions of adjacent pixels, M, N>1) regions of pixels of different color sets can have two dimensional pixel position region 1702 representing light incident on pixels of a first color set and two dimensional pixel position regions 1704 representing light incident on pixels of a second color set of pixels. Terminal 1000 can be operative so that for execution of one decoding algorithm terminal 1000 examines image data of only one of the sets. Terminal 1000 can be operative to selectively process more than one color set of image data when processing image data of a single frame. For execution of a first decoding algorithm performed using a certain frame terminal 1000 can restrict processing to image data of a first color set of the certain frame. For execution of a second decoding algorithm performed using the certain frame, terminal 1000 can restrict processing to image data of a second color set of the certain frame. Alternative filter patterns for image sensor pixel array 1033 are shown in FIGS. 18 and 19, showing alternative filter patterns that can be distributed throughout an array.

Figure 18:
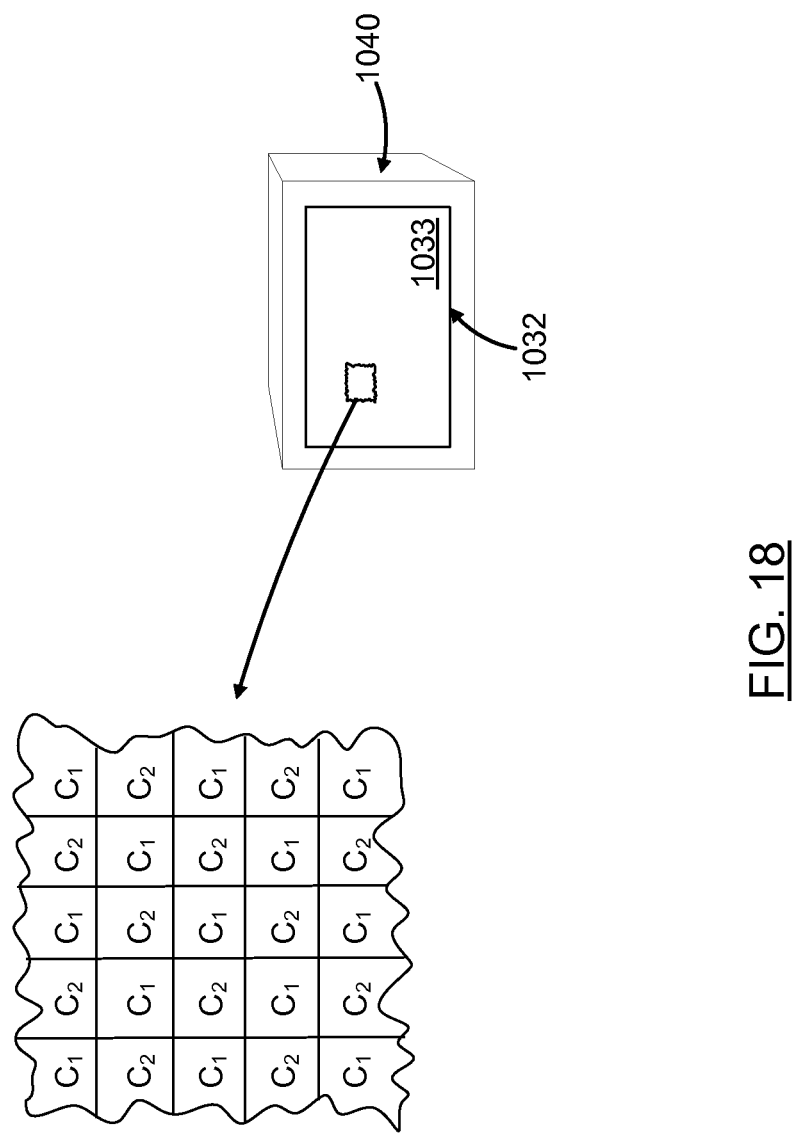
FIG. 18 is a schematic diagram of an image sensor integrated circuit having a two color channel image sensor pixel array with alternating pixels of different color sets.
Figure 19:
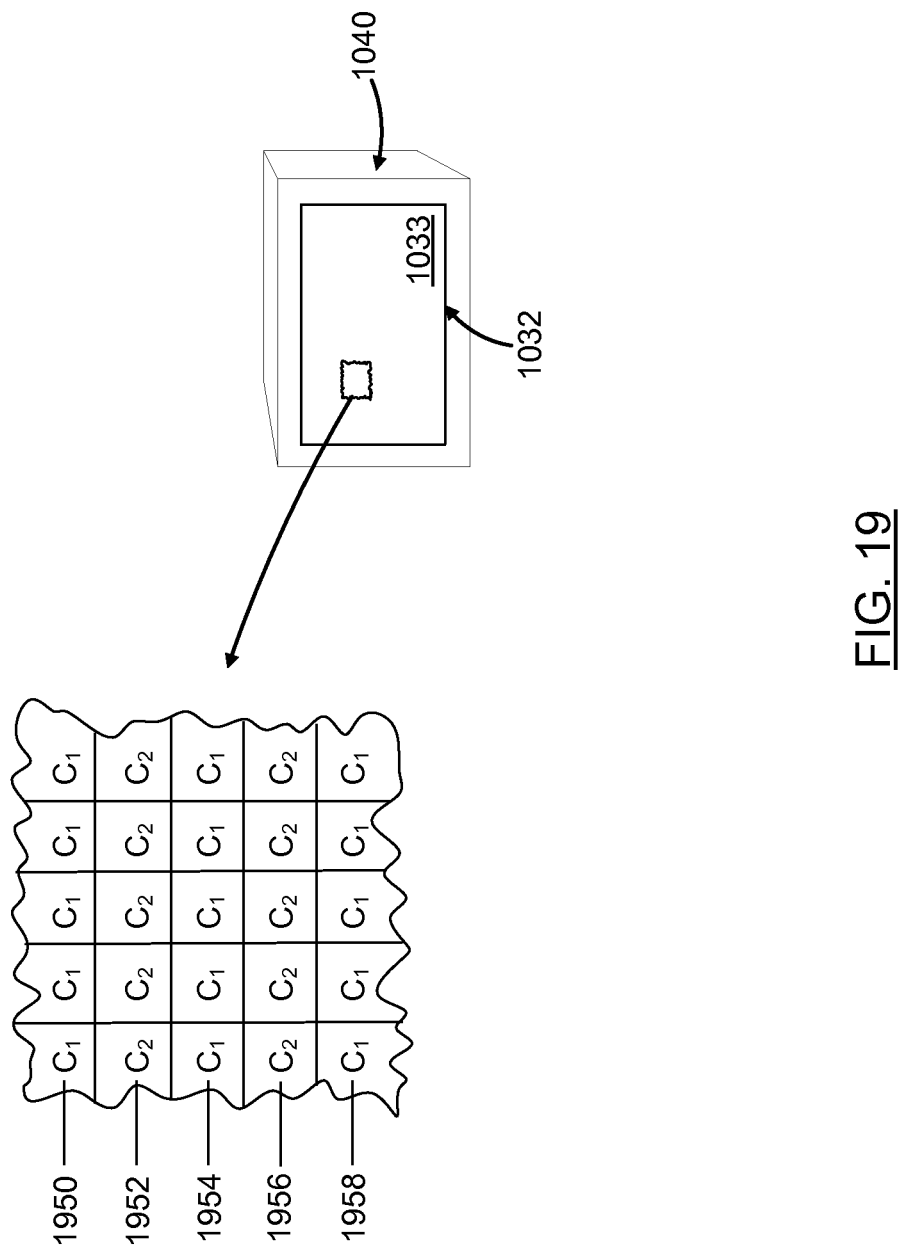
FIG. 19 is a schematic diagram of an image sensor integrated circuit having a two color channel image sensor pixel array with alternating rows of different color sets.

In FIGS. 18 and 19, colors $C_1$ and $C_2$ can represent different colors of the visible spectrum, e.g., each of $C_1$ and $C_2$ can represent red, green or blue with $C_1$ and $C_2$ being differentiated. In the example of FIG. 18, pixels of different color sets are defined in a checkerboard pattern wherein adjacent pixels are of different color sets. In the example of FIG. 19, pixels of different color sets are defined in alternating rows of pixels of different color sets. In the example of FIGS. 18 and 19, image sensor pixel array 1033 is devoid of pixels outside of the different color sets $C_1$ and $C_2$ defined by different wavelength selective filters that transmit light at first and second different wavelengths, wherein the first and second wavelengths can be narrow wavelength bands corresponding to a particular color of the visible color spectrum. Frames of image data can be read out of image sensor pixel array 1033 having pixel position patterns corresponding to the filter patterns of FIGS. 18 and 19. Processing of a frame captured using an image sensor pixel array 1033 as depicted in FIG. 18 can occur in the manner of the frame depicted in FIG. 10, except that an interpolation using image data of a third color set can be avoided, i.e., interpolation can be performed utilizing image data of only two color sets; hence processing speed as well as spatial sampling is improved relative to the Bayer pattern example of FIG. 8. An interpolated frame captured utilizing the image sensor pixel array 1033 of FIG. 18 can be expected to have greater accuracy relative to the image sensor pixel array 1033 of FIG. 8 since there are fewer interpolated pixel values of an interpolated frame of a certain color set. A frame captured utilizing an image sensor pixel array 1033 as depicted in FIG. 19 can be processed in the manner of a frame captured using an image sensor pixel array depicted in FIG. 15 except that readout and/or processing of image data of a third color set (non-existent in the frame) is avoided. Selective utilization of image data can comprise selective readout of pixels of only one color set, and/or selective processing of image data restricted to image data of a single color set (i.e., image data representing light incident on a single color set of pixels) for execution of a certain decoding algorithm. The result of utilizing an image sensor pixel array depicted in FIG. 19 as compared to FIG. 15 is that processing speed and decode time can be expected to be improved, relative to an array wherein pixels of more than two color sets are subject to readout and/or processing with one or more successive frames.

As has been set forth herein that indicia reading terminal 1000 in one embodiment can include an image sensor pixel array having a plurality of pixels, the plurality of pixels including a first color set of pixels and a second color set of pixels, the first color set of pixels having wavelength selective filters transmitting light of a first wavelength, the second color set of pixels having wavelength selective filters transmitting light of a second wavelength. As has been further set forth herein, terminal 1000 can further include an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range.

In one embodiment, optical imaging assembly 200 can be configured so that the second focus range corresponding to light rays of the second wavelength is a farther field focus range than the first focus range. In a further aspect of such embodiment, image sensor pixel array 1033 can include a filter pattern having a region wherein a density of pixels of the second color set of pixels is greater than a density of pixels of the first color set of pixels. In one example, terminal 1000 can be configured so that the second color set of pixels transmitting light at the second wavelength are green pixels and further so that image sensor pixel array 1033 includes a Bayer pattern filter as depicted in FIG. 8. A Bayer pattern image sensor pixel array 1033 as depicted in FIG. 8 includes a higher density of green pixels than either red or blue pixels (green pixels at 2× the density of blue pixels). In the development of terminal 1000 it was noted that reading of decodable indicia is more likely to fail at longer reading distances due to a reduction of spatial sampling. A bar code symbol of a certain size can consume a correspondingly smaller portion of a field of view at longer reading distances. By configuring the optical imaging assembly 200 so that for light rays of the first wavelength the optical imaging assembly has a first focus range and for light rays of the second wavelength the optical imaging assembly has a second focus range, and further so that the second focus range is a farther field focus range than the first focus range and further so that image sensor pixel array 1033 has a region wherein pixels of a second color set have filters so that the pixels of the second color set transmit at the second wavelength and are of a relatively higher density than pixels of the first color set, the expected increase in read failure rate typically associated with longer reading distances is reduced.

In another embodiment indicia reading terminal 1000 can have a first operator selectable mode and a second operator selectable mode, wherein the indicia reading terminal responsively to a trigger signal activation with the first mode active attempts to decode a decodable indicia utilizing image data representing light incident on the first color set of pixels without utilizing image data representing light incident of the second color set of pixels, and wherein the indicia reading terminal responsively to a trigger signal activation with the second mode active attempts to decode a decodable indicia utilizing image data representing light incident on the first color set of pixels and the second color set of pixels. The modes in one embodiment can be selected with use of virtual mode selection buttons displayed on display 1222 corresponding to each of the first and second modes.

In one example of utilizing image data representing light incident on the first color set of pixels without utilizing image data representing light incident of the second color set of pixels, the set of one or more frames read out responsively to a trigger signal activation are read out by selectively addressing pixels of the first color set while avoiding readout of pixels of the second color set. In another example of utilizing image data representing light incident on the first color set of pixels without utilizing image data representing light incident of the second color set of pixels, the set of one or more frames read out responsively to a trigger signal activation comprise image data representing light incident on both the first and second color sets, but terminal 1000 in processing image data processes image data representing light incident on pixels of the first color set and is restricted from processing image data representing light incident on pixels of the second color set. With the second mode active terminal 1000 can be operative to readout and process image data representing light incident on the first color set of pixels and the second color set of pixels for attempting to decode a decodable indicia. The selection of the first mode can yield advantages where terminal 1000 is to be used at a known reading distance. Selection of the first mode where the terminal 1000 is to be used within the first focus range can be expected to improve a read time as readout and or processing of image data less likely to be processable for a successful decode can be avoided. The selection of the second mode can result in an increased depth of field for terminal 1000 and can be advantageous where terminal 1000 is to be used at an unknown reading distance. Terminal 1000 in one embodiment can be operative in the first mode and can be restricted from operating in the second mode. Terminal 1000 in one embodiment can be operative in the second mode and can be restricted from operating in the first mode.

A small sample of systems methods and apparatus that are described herein is as follows:

A1. An indicia reading terminal comprising:
an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength;
a hand held housing in which the image sensor pixel array is disposed;
an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range;
wherein the indicia reading terminal is operative for capture of a frame of image data including image data representing light incident on one or more of the first set of pixels or the second set of pixels;
wherein the indicia reading terminal is operative for utilizing image data of the frame representing light incident on one or more of the first set of pixels or the second set of pixels for attempting to decode a decodable indicia.

A2. The indicia reading terminal of claim A1, wherein the indicia reading terminal is operative for selectively utilizing image data of the frame representing light incident on the first set of pixels for attempting to decode a decodable indicia.

A3. The indicia reading terminal of A2, wherein for selectively utilizing image data of the frame representing light incident on the first set of pixels, the indicia reading terminal selectively addresses for readout pixels of the first set of pixels.

A4. The indicia reading terminal of A2, wherein for selectively utilizing image data of the frame representing light incident on the first set of pixels, the indicia reading terminal performs selective processing of image data representing light incident on the frame of image data.

A5. The indicia reading terminal of A4, wherein for performance of the selective processing the indicia reading terminal interpolates pixel values for pixel positions not representing light incident on the first set of pixels utilizing image data representing light incident on the first set of pixels.

A6. The indicia reading terminal of A4, wherein for performance of the selective processing the indicia reading terminal restricts a scan line to image data representing light incident on the first set of pixels.

A7. The indicia reading terminal of A4, wherein for performance of the selective processing the indicia reading terminal, restricts image data examined for attempting to decode the decodable image data to image data representing light incident on the first set of pixels.

A8. The indicia reading terminal of A2, wherein the indicia reading terminal is further operative to selectively utilize image data representing light incident on the third set of pixels for attempting to decodable indicia.

A9. The indicia reading terminal of A1, wherein the indicia reading terminal is operative so that responsively to activation of a trigger signal the indicia reading terminal captures a first frame of image data and a second frame of image data, the indicia reading terminal selectively utilizing image data of the first frame representing light incident on the first set of pixels for attempting to decode a decodable indicia, the indicia reading terminal selectively utilizing image data of the second frame of image data representing light incident on the second set of pixels for attempting to decode decodable indicia.

A10. The indicia reading terminal of A9, wherein for selectively utilizing image data of the first frame representing light incident on the first set of pixels, the indicia reading terminal selectively addresses for readout pixels of the first set of pixels.

A11. The indicia reading terminal of A9, wherein for selectively utilizing image data of the frame representing light incident on the first set of pixels, the indicia reading terminal performs selective processing of image data representing light incident on the first set of pixels, the selective processing including one or more of interpolating pixel values for pixel positions not representing light incident on pixels of the first set utilizing image data representing light incident on the first set of pixels, restricting a scan line to image data representing light incident on the first set of image data and restricting image data examined for attempting to decode the decodable indicia to image data representing light incident on pixels of the first set of pixels.

A12. The indicia reading terminal of A1 wherein the optical imaging assembly is a stationary optical imaging assembly devoid of a mechanism for changing a lens setting.

A13. The indicia reading terminal of A1, wherein the image sensor pixel array includes a Bayer pattern.

A14. The indicia reading terminal of A1, wherein the image sensor pixel array has a first row of pixels including ten or more adjacent pixels of the first set of pixels and a second row of pixels including a ten or more adjacent pixels of the second set of pixels.

A15. The indicia reading terminal of A1, wherein the image sensor pixel array has a first row of pixels consisting of pixels of the first set of pixels and a second row of pixels consisting of pixels of the second set of pixels.

A16. The indicia reading terminal of A1, wherein the indicia reading terminal has a first operator selectable mode and a second operator selectable mode, wherein the indicia reading terminal responsively to a trigger signal activation with the first mode active attempts to decode a decodable indicia utilizing image data representing light incident on the first set of pixels without utilizing image data representing light incident on the second set of pixels, wherein the indicia reading terminal responsively to a trigger signal activation with the second mode active attempts to decode a decodable indicia utilizing image data representing light incident on the first set of pixels and the second set of pixels.

A17. The indicia reading terminal of A1, wherein the optical imaging assembly comprises one or more lens and an axially symmetric phase mask.

A18. The indicia reading terminal of A17, wherein the axially symmetric phase mask has regions of different phase shifting attributes.

A19. The indicia reading terminal of A1, wherein the image sensor pixel array includes a Bayer pattern filter.

A20. The indicia reading terminal of A1, wherein the indicia reading terminal includes an illumination assembly for projecting an illumination pattern, the illumination assembly having a light source bank that emits light in a visible color wavelength range that exceeds 20 nm.

A21. The indicia reading terminal of A1, wherein the indicia reading terminal includes an illumination assembly for projecting an illumination pattern, the illumination assembly having a light source bank that emits light in a visible color wavelength range that exceeds 100 nm.

A22. The indicia reading terminal of A1, wherein the indicia reading terminal includes an illumination assembly for projecting an illumination pattern, the illumination assembly having a light source bank that emits light in a visible color wavelength range that exceeds 200 nm.

A23. The indicia reading terminal of A1, wherein the indicia reading terminal includes an illumination assembly for projecting an illumination pattern, the illumination assembly having a light source bank comprising one or more light source that emits white light.

B1. An indicia reading terminal comprising:
    an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength;
    a hand held housing in which the image sensor pixel array is disposed;
    an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range, the second focus range being a farther field focus range than the first focus range;
    wherein the image sensor pixel is an image sensor pixel array selected from the group consisting of (a) an image sensor pixel array devoid of pixels that are not either of the first set of pixels or the second set of pixels (b) an image sensor pixel array wherein adjacent pixels of the image sensor pixel array have wavelength selective filters transmitting light of a common wavelength and (c) an image sensor pixel array having a region for use in capturing image data representative of a decodable indicia wherein a density of pixels of the second set of pixels is greater than a density of pixels of the first set of pixels;
    wherein the indicia reading terminal is operative for capture of a frame of image data including image data representing light incident on one or more of the first set of pixels or the second set of pixels;
    wherein the indicia reading terminal is further operative for utilizing image data of the frame representing one or more of first set of pixels or the second set of pixels for attempting to decode a decodable indicia.

B2. The indicia reading terminal of B1, wherein the image sensor pixel array has a first row of pixels including ten or more adjacent pixels of the first set of pixels and a second row of pixels including a ten or more adjacent pixels of the second set of pixels.

B3. The indicia reading terminal of B1, wherein the image sensor pixel array has a first row of pixels consisting of pixels of the first set of pixels and a second row of pixels consisting of pixels of the second set of pixels, and wherein the image sensor pixel array is devoid of pixels that are not either of the first set of pixels or the second set of pixels.

B4. The indicia reading terminal of B1, wherein the image sensor pixel array is devoid of pixels that are not either of the first set of pixels or the second set of pixels.

B5. The indicia reading terminal of B1, wherein adjacent pixels of the image sensor pixel array have wavelength selective filters transmitting light of a common wavelength.

B6. The indicia reading terminal of B1, wherein the image sensor pixel array is devoid of pixels that are not either of the first set of pixels or the second set of pixels, and wherein the image sensor pixel array includes a checkerboard pattern wherein adjacent pixels of the image sensor pixel array are alternatingly of the first set of pixels or the second set of pixels.

B7. The indicia reading terminal of B1, wherein the image sensor pixel array is devoid of pixels that are not either of the first set of pixels or the second set of pixels, and wherein the image sensor pixel array includes a checkerboard pattern wherein rows of pixels of the image sensor pixel array are alternatingly of the first set of pixels or the second set of pixels.

B8. The indicia reading terminal of B1, wherein the first focus range and the second focus range overlap.

B10. The indicia reading terminal of B1, wherein the image sensor pixel array has a region for use in capture of image data representing a decodable indicia wherein a density of pixels of the second set of pixels is greater than a density of pixels of the first set of pixels.

B11. The indicia reading terminal of B1, wherein the image sensor pixel array is an image sensor pixel array that qualifies as two or more or the following: (a) an image sensor pixel array devoid of pixels that are not either of the first set of pixels or the second set of pixels (b) an image sensor pixel array wherein adjacent pixels of the image sensor pixel array have wavelength selective filters transmitting light of a common wavelength and (c) an image sensor pixel array having a region for use in capturing image data representative of a decodable indicia wherein a density of pixels of the second set of pixels is greater than a density of pixels of the first set of pixels.

B12. The indicia reading terminal of B1, wherein the optical imaging assembly comprises an axially symmetric phase mask in combination with one or more lens.

B13. The indicia reading terminal of B12, wherein the axially symmetric phase mask has regions of different phase shifting attributes.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. An indicia reading terminal comprising:
   an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength;
   a hand held housing in which the image sensor pixel array is disposed;
   an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range;
   wherein the indicia reading terminal is operative for capture of a frame of image data including image data representing light incident on one or more of the first set of pixels or the second set of pixels;
   wherein the indicia reading terminal is operative for utilizing image data of the frame representing light incident on one or more of the first set of pixels or the second set of pixels for attempting to decode a decodable indicia;
   wherein the optical imaging assembly comprises one or more lens and an axially symmetric phase mask.

2. The indicia reading terminal of claim 1, wherein the indicia reading terminal is operative for selectively utilizing image data of the frame representing light incident on the first set of pixels for attempting to decode a decodable indicia.

3. The indicia reading terminal of claim 2, wherein for selectively utilizing image data of the frame representing light incident on the first set of pixels, the indicia reading terminal selectively addresses for readout pixels of the first set of pixels.

4. The indicia reading terminal of claim 2, wherein for selectively utilizing image data of the frame representing light incident on the first set of pixels, the indicia reading terminal performs selective processing of image data representing light incident on the frame of image data.

5. The indicia reading terminal of claim 1, wherein the indicia reading terminal is operative so that responsively to activation of a trigger signal the indicia reading terminal captures a first frame of image data and a second frame of image data, the indicia reading terminal selectively utilizing image data of the first frame representing light incident on the first set of pixels for attempting to decode a decodable indicia, the indicia reading terminal selectively utilizing image data of the second frame of image data representing light incident on the second set of pixels for attempting to decode decodable indicia.

6. The indicia reading terminal of claim 1 wherein the optical imaging assembly is a stationary optical imaging assembly devoid of a mechanism for changing a lens setting.

7. The indicia reading terminal of claim 1, wherein the image sensor pixel array includes a Bayer pattern.

8. The indicia reading terminal of claim 1, wherein the image sensor pixel array has a first row of pixels including ten or more adjacent pixels of the first set of pixels and a second row of pixels including a ten or more adjacent pixels of the second set of pixels.

9. The indicia reading terminal of claim 1, wherein the indicia reading terminal has a first operator selectable mode and a second operator selectable mode, wherein the indicia reading terminal responsively to a trigger signal activation with the first operator selectable mode active attempts to decode a decodable indicia utilizing image data representing light incident on the first set of pixels without utilizing image data representing light incident on the second set of pixels, wherein the indicia reading terminal responsively to a trigger signal activation with the second operator selectable mode active attempts to decode a decodable indicia utilizing image data representing light incident on the first set of pixels and the second set of pixels.

10. The indicia reading terminal of claim 1, wherein the axially symmetric phase mask has regions of different phase shifting attributes.

11. The indicia reading terminal of claim 1, wherein the image sensor pixel array includes a Bayer pattern filter.

12. The indicia reading terminal of claim 1, wherein the indicia reading terminal includes an illumination assembly for projecting an illumination pattern, the illumination assembly having a light source bank comprising one or more light source that emits white light.

13. An indicia reading terminal comprising:
an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength;
a hand held housing in which the image sensor pixel array is disposed;
an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range, the second focus range being a farther field focus range than the first focus range;
wherein the image sensor pixel is an image sensor pixel array selected from the group consisting of (a) an image sensor pixel array devoid of pixels that are not either of the first set of pixels or the second set of pixels and (b) an image sensor pixel array wherein adjacent pixels of the image sensor pixel array have wavelength selective filters transmitting light of a common wavelength;
wherein the indicia reading terminal is operative for capture of a frame of image data including image data representing light incident on one or more of the first set of pixels or the second set of pixels;
wherein the indicia reading terminal is further operative for utilizing image data of the frame representing one or more of first set of pixels or the second set of pixels for attempting to decode a decodable indicia.

14. The indicia reading terminal of claim 13, wherein the image sensor pixel array is devoid of pixels that are not either of the first set of pixels or the second set of pixels.

15. The indicia reading terminal of claim 13, wherein adjacent pixels of the image sensor pixel array have wavelength selective filters transmitting light of a common wavelength.

16. The indicia reading terminal of claim 13, wherein the image sensor pixel array is devoid of pixels that are not either of the first set of pixels or the second set of pixels, and wherein the image sensor pixel array includes a checkerboard pattern wherein adjacent pixels of the image sensor pixel array are alternatingly of the first set of pixels or the second set of pixels.

17. The indicia reading terminal of claim 13, wherein the image sensor pixel array is devoid of pixels that are not either of the first set of pixels or the second set of pixels, and wherein the image sensor pixel array includes a checkerboard pattern wherein rows of pixels of the image sensor pixel array are alternatingly of the first set of pixels or the second set of pixels.

18. The indicia reading terminal of claim 13, wherein the first focus range and the second focus range overlap.

19. The indicia reading terminal of claim 13, wherein the image sensor pixel array has a region for use in capture of image data representing a decodable indicia wherein a density of pixels of the second set of pixels is greater than a density of pixels of the first set of pixels.

20. The indicia reading terminal of claim 13, wherein the image sensor pixel array is an image sensor pixel array that qualifies as two or more or the following: (a) an image sensor pixel array devoid of pixels that are not either of the first set of pixels or the second set of pixels (b) an image sensor pixel array wherein adjacent pixels of the image sensor pixel array have wavelength selective filters transmitting light of a common wavelength and (c) an image sensor pixel array having a region for use in capturing image data representative of a decodable indicia wherein a density of pixels of the second set of pixels is greater than a density of pixels of the first set of pixels.

21. The indicia reading terminal of claim 13, wherein the optical imaging assembly comprises an axially symmetric phase mask in combination with one or more lens.

22. The indicia reading terminal of claim 21, wherein the axially symmetric phase mask has regions of different phase shifting attributes.

23. The indicia reading terminal of claim 13, wherein the image sensor pixel array is devoid of pixels that are not either of the first set of pixels or the second set of pixels, and wherein a density of pixels of the second set of pixels is greater than a density of pixels of the first set of pixels.

24. An indicia reading terminal comprising:
an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength;
a hand held housing in which the image sensor pixel array is disposed;
an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range;
wherein the indicia reading terminal is operative for capture of a frame of image data including image data representing light incident on one or more of the first set of pixels or the second set of pixels;
wherein the indicia reading terminal is operative for utilizing image data of the frame representing light incident on one or more of the first set of pixels or the second set of pixels for attempting to decode a decodable indicia;
wherein for selectively utilizing image data of the frame representing light incident on the first set of pixels, the indicia reading terminal selectively addresses for readout pixels of the first set of pixels.

25. An indicia reading terminal comprising:
an image sensor pixel array having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength;
a hand held housing in which the image sensor pixel array is disposed;
an optical imaging assembly for focusing imaging light rays onto the image sensor pixel array, the optical imaging assembly being adapted so that for light rays of the first wavelength the optical imaging assembly has a first focus range and for light rays of the second wavelength the optical imaging assembly has a second focus range;
wherein the indicia reading terminal is operative for capture of a frame of image data including image data representing light incident on one or more of the first set of pixels or the second set of pixels;
wherein the indicia reading terminal is operative for utilizing image data of the frame representing light incident on one or more of the first set of pixels or the second set of pixels for attempting to decode a decodable indicia;
wherein the optical imaging assembly comprises one or more lens and an axially symmetric phase mask;
wherein the image sensor pixel array has a first row of pixels including ten or more adjacent pixels of the first set of pixels and a second row of pixels including a ten or more adjacent pixels of the second set of pixels.

* * * * *